*J. Lemman,*
*Circular Sawing Machine.*
Nº 24,314. Patented June 7, 1859.
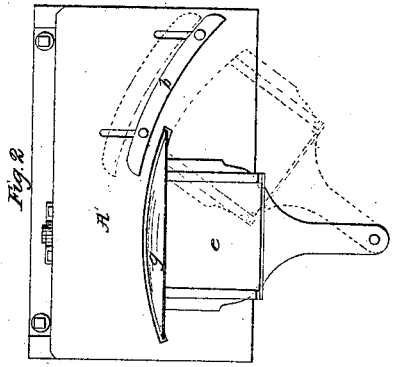
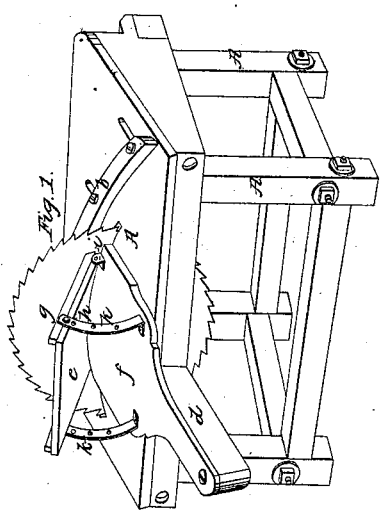
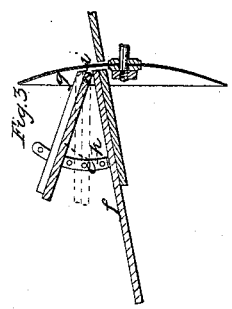
Witnesses:
Inventor:
John Lemman

UNITED STATES PATENT OFFICE.

JOHN LEMMAN, OF CINCINNATI, OHIO.

MACHINE FOR SAWING CIRCULAR BEVELS.

Specification of Letters Patent No. 24,314, dated June 7, 1859.

*To all whom it may concern:*

Be it known that I, JOHN LEMMAN, of Cincinnati, in the county of Hamilton and State of Ohio, have invented a new and useful Improvement in Machines for Sawing Bevels; and I do hereby declare that the following is a full and clear description thereof, reference being had to the accompanying drawings and to the letters of reference marked thereon and made to form a part of this specification.

The nature of my invention relates to the arrangement of an adjustable rest, or plain, upon a pivoted, movable carriage or bed with reference to the concave face of a dished saw, in such manner, that lumber may be sawed at any desired bevel, as hereinafter specified and represented.

In reference to the accompanying drawings Figure 1, is a perspective view of the machine, showing the adjustable rest, arranged as for operation upon a pivoted movable bed, in connection with an inclined table and dished or concave saw. Fig. 2, is a plan, and Fig. 3, a sectional elevation of the machine, showing the arrangement of the adjustable rest, and its adaptation to the sawing of bevels, at different angles.

(A) represents the table formed with an inclined face (A'), and, projection (d); (b) is a movable (gage) secured to the face (A') of the table by means of set screws, and serves as a guide to the operator in feeding lumber to the saw.

Pivoted to the projection (d) of the table, at a point which forms the center of a circle, of which the saw (g) is an arc, is a movable bed (f) arranged in harmony with the inclination of the face (A') of the table, so that the lumber carried upon the rest (e) may be sawed in the proper arch or bevel or both without binding against the saw; the rest (e) is hinged to the bed (f) at (i) and from the point (i) inclines upwardly, so that its inclination is opposite that of the bed (f)—the rest (e) is adjustable vertically with reference to the bed (f) by means of posts (k) and set screws (h) in such manner that lumber may be presented to the saw at different angles, without incurring the necessity of changing the position of the bed (f) with reference to the face (A') of the table.

In pivoted, moving, or swinging carriages or beds hitherto used in machines for sawing bevels, their adjustment with reference to the presentation of lumber to the saw at different angles, has generally been attempted at the pivoted point, thereby destroying the harmony of inclination between the bed and the face of the table, and rendering the lumber liable to bind against the saw.

The object of my invention is to obviate this difficulty and by means of the adjustable rest (e) I am enabled to present the lumber to the saw at any desired angle, at the same time preserving the center, from which the bed (f) is made to operate, and thereby preventing the lumber in any case from binding against the saw, and also to secure the required adjustment, without difficulty or loss of time.

I do not claim the pivoted movable bed (f) or any manner of adjusting the same, as I am aware that similar devices have been used but What I do claim as my invention and desire to secure by Letters Patent is—

The adjustable rest (e) hinged to the bed (f) in the manner described, and adjustable vertically with reference thereto, substantially as and for the purposes set forth.

In testimony of which invention I have hereunto set my hand.

JOHN LEMMAN.

Witnesses:
   H. E. CLIFTON,
   D. O. PINGE.